(12) United States Patent
Coles et al.

(10) Patent No.: US 7,308,325 B2
(45) Date of Patent: Dec. 11, 2007

(54) AUDIO SYSTEM

(75) Inventors: Alistair Neil Coles, Bath (GB); Lawrence Wilcock, Malmesbury (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1046 days.

(21) Appl. No.: 10/057,959

(22) Filed: Jan. 29, 2002

(65) Prior Publication Data

US 2002/0111705 A1  Aug. 15, 2002

(30) Foreign Application Priority Data

Jan. 29, 2001  (GB) ................. 0102230.0
Nov. 20, 2001  (GB) ................. 0127753.2

(51) Int. Cl.
*G06F 17/00* (2006.01)
*H04R 5/02* (2006.01)

(52) U.S. Cl. ................ 700/94; 381/17; 381/310
(58) Field of Classification Search ........... 700/94; 455/3.06; 381/17, 18, 310
See application file for complete search history.

(56) References Cited

U.S. PATENT DOCUMENTS

| | | | |
|---|---|---|---|
| 4,176,252 A * | 11/1979 | Dutkovich .................. 381/107 |
| 5,500,673 A * | 3/1996 | Zhou .......................... 348/156 |
| 5,521,981 A * | 5/1996 | Gehring ....................... 381/17 |
| 5,632,005 A | 5/1997 | Davis et al. |
| 5,715,317 A * | 2/1998 | Nakazawa .................... 381/17 |
| 5,768,393 A * | 6/1998 | Mukojima et al. ............ 381/17 |
| 5,809,149 A * | 9/1998 | Cashion et al. ............... 381/17 |
| 5,943,427 A | 8/1999 | Massie et al. |
| 5,953,506 A | 9/1999 | Kalra et al. |
| 5,974,376 A * | 10/1999 | Hassan et al. .............. 704/220 |
| 6,011,851 A * | 1/2000 | Connor et al. ............... 381/17 |
| 6,054,989 A | 4/2000 | Robertson et al. |
| 6,055,619 A * | 4/2000 | North et al. .................. 712/36 |
| 6,072,878 A * | 6/2000 | Moorer ........................ 381/18 |
| 6,115,688 A * | 9/2000 | Brandenburg et al. ...... 704/503 |

(Continued)

FOREIGN PATENT DOCUMENTS

WO  WO 99/04498  1/1999

OTHER PUBLICATIONS

Kobayashi, Minoru et al, "Dynamic Soundscape: mapping time to space for audio browsing," CHI 97 Electronic Publications: Papers, http://www.acm.org/sigchi/chi97/proceedings/paper/kob.htm.

(Continued)

*Primary Examiner*—Sinh Tran
*Assistant Examiner*—Daniel R Sellers

(57) ABSTRACT

An audio system comprises an audio source terminal 11 and a audio playback terminal 13, connected to each another by a wireless data link 14. The source terminal 11 comprises a source computer 15, and a cellular modem 17. The playback terminal 13 comprises a playback computer 19 having an internal processor 23 and an audio processor 24. Connected to the processor 23 is a cellular modem 21, an audio transducer 25, and a user control 27. Data relating to audio components, representing different services, is stored at the source terminal 11 where it is spatially processed and transmitted to the playback terminal. At the same time, each individual audio component is transmitted at a lower bit-rate than the spatially processed data, to the audio source terminal 11, whereafter it is spatially processed. Although the low bit-rate transmission causes a loss of audio quality, the positional data remains unaffected. Accordingly, when played, the combination of a high quality signal with low three-dimensional audio positional accuracy, and a set of low quality signals with high three-dimensional audio positional accuracy, results in restoration of the human perception of three-dimensional position to the degraded three-dimensional audio signal.

23 Claims, 4 Drawing Sheets

U.S. PATENT DOCUMENTS

| | | | | |
|---|---|---|---|---|
| 6,122,338 | A * | 9/2000 | Yamauchi | 375/377 |
| 6,343,130 | B2 * | 1/2002 | Yamazaki | 381/309 |
| 6,424,357 | B1 * | 7/2002 | Frulla et al. | 715/728 |
| 6,487,572 | B2 * | 11/2002 | Kamiya et al. | 708/313 |
| 6,647,119 | B1 * | 11/2003 | Slezak | 381/17 |
| 6,904,152 | B1 * | 6/2005 | Moorer | 381/18 |
| 7,079,658 | B2 * | 7/2006 | Lapicque | 381/17 |
| 2001/0046199 | A1 * | 11/2001 | McPherson et al. | 369/59.21 |

OTHER PUBLICATIONS

Billinghurst, M. et al, "A Wearable Spatial Conferencing Space," Human Interface Technology Laboratory, Seattle, WA and Advanced Perception Unit, Ipswich, UK.

Goose, S. et al, "A 3D Audio Only Interactive Web Browser: Using Spatialization to Convey Hypermedia Document Structure," ACM Multimedia '99 Oct. 1999, Orlando, FL.

Sawhney, Nitin et al, "Speaking and Listening on the Run: Design for Wearable Audio Computing," 1998 IEEE.

Kyriakakis, C. et al, "Signal Processing, Acoustics, and Psychoacoustics for High Quality Desktop Audio," *Journal of Visual Communication and Image Representation,* vol. 9, No. 1, March, pp. 51-61, 1998.

King, Robert B. et al, "The Impact of Signal Bandwidth on Auditory Localization: Implications for the Design of Three-Dimensional Audio Displays," *Human Factors,* 1997, 39(2), 287-295.

* cited by examiner

AUDIO SYSTEM

RELATED APPLICATIONS

The present application is based on, and claims priority from, British Application Ser. No. 0102230.0, filed Jan. 29, 2001, and British Application Ser. No. 0127753.2, filed Nov. 20, 2001, the disclosure of both of which are hereby incorporated by reference herein in their entirety.

This invention relates to an audio system, to a playing terminal for an audio system, and to a method of operating a playing terminal for use in an audio system.

BACKGROUND ART

The use of sound as a means of presenting computer-based services previously represented in visual form (e.g. on a computer monitor) has been proposed. In particular, it has been proposed that spatialisation processing of different sounds be performed such that the sounds, when played through loudspeakers or some other audio transducer, are presented at particular positions in the three-dimensional audio field. It is envisaged that this will enable Internet-style browsing using only sound-based links to services.

Such a three-dimensional audio interface will use spatialisation processing of sounds to present services in a synthetic, but realistically plotted, three-dimensional audio field. Sounds, representing services and/or information could be placed at different distances to the front, rear, left, right, up and down of the user. An example of a service is a restaurant. A pointer to the restaurant (the equivalent of a hyperlink) can be positioned in the audio field for subsequent selection. There are several ways in which the 'audio hyperlink' can be represented, for example by repeating a service name (e.g. the name of the restaurant) perhaps with a short description of the service, by using an earcon for the service (e.g. a memorable jingle or noise), or perhaps by using an audio feed from the service.

Such a system relies upon a high quality audio interface which is capable of rendering a three-dimensional audio field. Given that each sound, representing a service, is likely to be sent to a user's terminal from a remote device (e.g. the service provider's own computer) it follows that a data link is required. Where the data link has limited bandwidth, and is susceptible to interference and noise (for example, if a wireless telephony link is used) or if the channel employs lossy audio codecs (coder-decoders), it is likely that the link will degrade the three-dimensional nature of the audio. This may have the effect of masking any user-perception of three-dimensional positioning of sounds. This problem can be reduced if each audio component, i.e. each set of data relating to a particular sound, is transmitted independently to the user's terminal where the components are then combined to form the spatialisation processed data. This processed data is not subjected to the lossy transmission link. However, such a system will require larger overall bandwidth in order to carry the multiple audio components. In many network applications, particularly mobile wireless networks, the bandwidth of the access link or channel is a limited and expensive commodity.

SUMMARY OF THE INVENTION

According to a first aspect of the invention, there is provided an audio system comprising: an audio source; a playing terminal connected to the audio source by means of a data link; and audio transducer means connected to the playing terminal, wherein a plurality of audio components are provided at the audio source, each audio component comprising (a) audio data relating to an audible sound or track, and (b) positional data: relating to a position in three-dimensional space, relative to the audio transducer means, at which each audible sound or track is to be perceived, the audio source being arranged to (i) generate, from the plurality of audio components, a first set of spatially processed data for transmission over the data link at a first bit rate, and (ii) individually transmit each of the audio components at a bit-rate which is lower than that of the first bit rate, the playing terminal being arranged to receive the first set of spatially processed data and each individual audio component, at their respective bit-rates, to generate a second set of spatially processed data using the individual audio components, and to output the first and second sets of spatially processed data by means of the audio transducer means.

In this case, spatially processed data is a set of data representing a description of the intended audio field, and will comprise the audio data and positional data for each audio component to be emitted, i.e. through the audio transducer means.

As briefly mentioned above, where channels having limited capacity are used, spatially processed data subsequently transmitted over this lossy channel will result in a degradation of the three-dimensional spatialisation effect. In other words, the positioning of the sounds can be affected. Here, a lower quality (due to lower bit-rate) version of each audio component is separately transmitted from the audio source. The positional data in these separate components remains unaffected by the channel. When outputted from the audio transducer means, together with the spatialised data, the audible sound relating to each component tends to correlate with the spatialised data so as to enable association, by the human ear, of each component with the corresponding audio sound in the spatialised data. Ultimately, the combination of a high quality signal with low positional accuracy (due to channel degradation) and a set of low quality audio signals with high positional accuracy results in restoration of human perception as to the three-dimensional position of a sound or sounds. Since the transmitted audio components are sent at a lower bit-rate, the required channel bandwidth is kept low.

Preferably, each audio component individually transmitted to the playback terminal is spatially processed at the playback terminal. This may be performed using a separate audio processing means provided at the playback terminal.

In practice, each different sound may be representative of a different service, and in effect, may be considered equivalent to an Internet-style hyperlink. The sound may comprise, for example, a stream of sound indicative of the service, or perhaps a memorable jingle or noise. A user is then able to select a particular sound in the three-dimensional audio field and perform an initiating operation in order to access the service represented by the sound. Each sound could be equated with a window on a computer desktop screen. Some windows might not be the focus window, but will still be outputting information in the background. In this system, each sound will be active, although only one will be of interest to a user at a particular time.

The audio system may comprise a user control device connected to the playing terminal and arranged to enable user-selection of one the audible sounds or tracks, corresponding to one of the audio components outputted from the audio transducer means, as a focus sound or track. The user control device may comprise a position sensor for being mounted on a body part of a user, the position sensor being arranged to cause selection of an audible sound or track as the focus sound or track by means of generating position data indicating the relative position of the user's body part, the playing device thereafter comparing the position data with the positional data for each of the audio components so as to determine the audible sound or track to which the user's body part is directed. The position sensor may be a head-mountable sensor, the playing device being arranged to determine the audible sound or track to which a part of the user's head is directed.

As an alternative to the position type control device, the user control device may comprise a selection switch or button, e.g. a trackball, or a voice recognition facility arranged to receive audible commands from a user and to interpret the received commands so as to determine which audible sound or track is selected as the focus sound or track.

The data link may be a wireless data link. The wireless data link may be established over a mobile telephone connection. Alternatively, a wired connection could be used, e.g. using a conventional Internet connection over telephone lines.

The audio source may be a network-based device.

According to a second aspect of the invention, there is provided an audio system comprising: a playing terminal connected to one or more audio sources by means of a data link; and audio transducer means connected to the playing terminal, wherein the playing terminal is arranged to receive, by means of an input port, (a) a plurality of audio components sent from one or more of the audio sources, each audio component comprising (i) audio data relating to an audible sound or track, and (ii) positional data relating to a position in three-dimensional space, relative to an audio transducer means, at which each audible sound or track is to be perceived and (b) a first set of spatially processed data sent from one of the audio sources, the first set of spatially processed data being generated at said audio source using the audio components and being received at a bit-rate which is greater than that at which the plurality of audio components are each received, the playing terminal also being arranged to generate a second set of spatially processed data using the received audio components and to output the first and second sets of spatially processed data by means of an output port.

In this particular aspect, although spatially processed data is received from one audio source, the plurality of (non-spatialised) components which are transmitted to the playback terminal may be sent from one or a plurality of different audio sources.

According to a third aspect of the invention, there is provided a playing terminal for use in an audio system, the playing terminal comprising: a first port for receiving data from an audio source by means of a data link; and a second port for outputting data, from the playing terminal, to an audio transducer means, wherein the playing terminal is arranged to receive, by means of the first port, (a) a plurality of audio components, each audio component comprising (i) audio data relating to an audible sound or track, and (ii) positional data relating to a position in three-dimensional space, relative to an audio transducer means, at which each audible sound or track is to be perceived and (b) a first set of spatially processed data generated using the plurality of audio components, the spatially processed data being received at a bit-rate which is greater than that at which the plurality of audio components are each received, the playing terminal also being arranged to generate a second set of spatially processed data from the audio components received, and to output the first and second sets of spatially processed data by means of the second port.

According to a fourth aspect of the invention, there is provided a method of operating a playing terminal for use in an audio system, the method comprising: receiving, at the playing terminal, a plurality of audio components transmitted over a data link from a remote audio source, each component comprising (i) audio data relating to an audible sound or track, and (ii) positional data relating to a position in three-dimensional space, relative to an audio transducer means, at which each audible sound or track is to be perceived; receiving, at the playing terminal a first set of spatially processed data generated using the plurality of audio components, the spatially processed data being received at a bit-rate which is greater than the bit-rate at which each audio component is received; and generating, using the received plurality of audio components, a second set of spatially processed data and simultaneously playing the first and second sets of spatially processed data from a transducer means connected to the playing terminal.

A user control device may be connected to the playing terminal, in which case the method may further comprise operating the user control device so as to select an audible sound or track, corresponding to one of the audio components outputted from the audio transducer means, as a focus sound or track.

The step of operating the user control device may comprise operating a position sensor mounted on a body part of a user, the position sensor causing selection of an audible sound or track as the focus sound or track by means of generating position data indicating the relative position of the user's body part, the playing device thereafter comparing the position data with the positional data for each of the audio components so as to determine the audible sound or track to which the user's body part is directed. The position sensor may be a head-mountable sensor, the playing device determining the audible sound or track to which a part of the user's head is directed.

As an alternative to the use of a positional sensor, the step of operating the user control device may comprise operating a selection switch or button, or operating a voice recognition facility arranged to receive audible commands from a user and to interpret the received commands so as to determine which audible sound or track is selected as the focus sound or track.

As mentioned previously, the data link may be a wireless data link, possibly established over a mobile telephone connection.

According to a fifth aspect of the invention, there is provided a computer program stored on a computer-usable medium, the computer program comprising computer-readable instructions for causing a processing device to perform the steps of: receiving, at the processing device, a plurality of audio components transmitted over a data link from a remote audio source, each component comprising (i) audio data relating to an audible sound or track, and (ii) positional data relating to a position in three-dimensional space, relative to an audio transducer means, at which each audible sound or track is to be perceived; receiving, at the processing device, a first set of spatially processed data generated using the plurality of audio components, the spatially processed data being received at a bit-rate which is greater than the bit-rate at which each audio component is received; and generating, using the received plurality of audio components, a second set of spatially processed data and simultaneously playing the first and second sets of spatially processed data from a transducer means connected to the playing terminal.

BRIEF DESCRIPTION OF THE DRAWINGS

The invention will now be described, by way of example, with reference to the accompanying drawings, in which:

Referring to FIGS. 1a, 1b and 1c, different methods of generating spatially processed data are shown. These Figures are intended to provide background information which is useful for understanding the invention.

DETAILED DESCRIPTION OF THE DRAWINGS

Figure 1A:
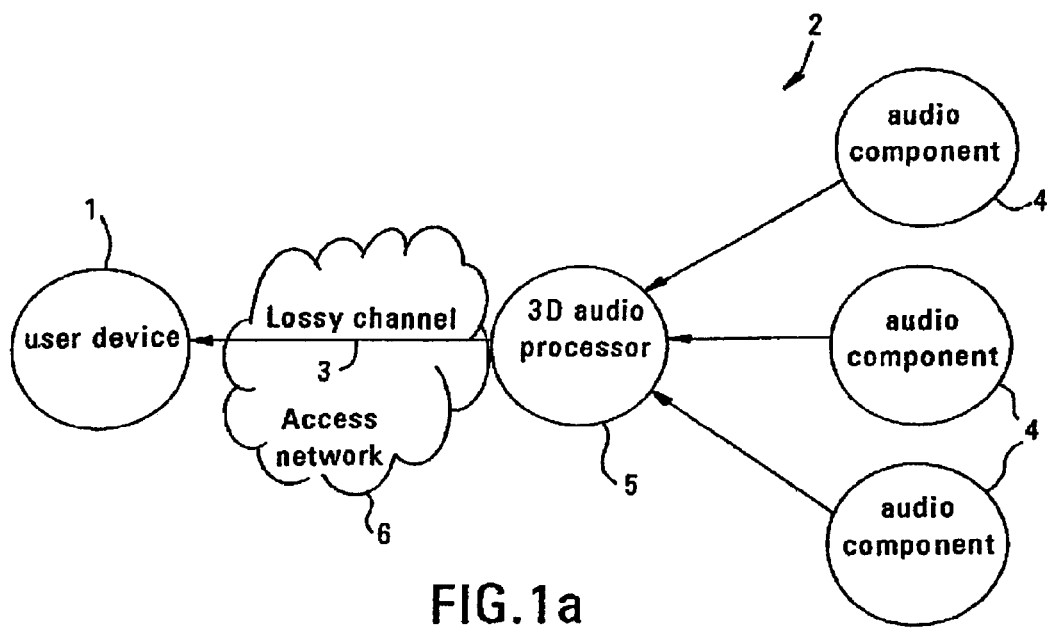
FIGS. 1a, 1b and 1c are diagrams showing different ways in which audio processing can be performed in an audio system.

In FIG. 1a, a user device is shown connected to an audio source 2 by means of a data link 3. At the audio source 2 are provided a plurality of audio components 4, each comprising audio data relating to a plurality of audible sounds or tracks, and positional data relating to a position in three-dimensional space at which each audible sound or track is to be perceived by a user. The audio components are input to a three-dimensional audio processor 5 for transmission over the data link 3. The audio processor 5 generates spatially processed data representing a composite description of where each set of audio data is to be plotted in three-dimensional space. The data link 3 is established using an access network 6. Due to limited available bandwidth, processed data subsequently transmitted over this lossy channel will result in a degradation of the three-dimensional spatialisation effect.

Figure 1B:
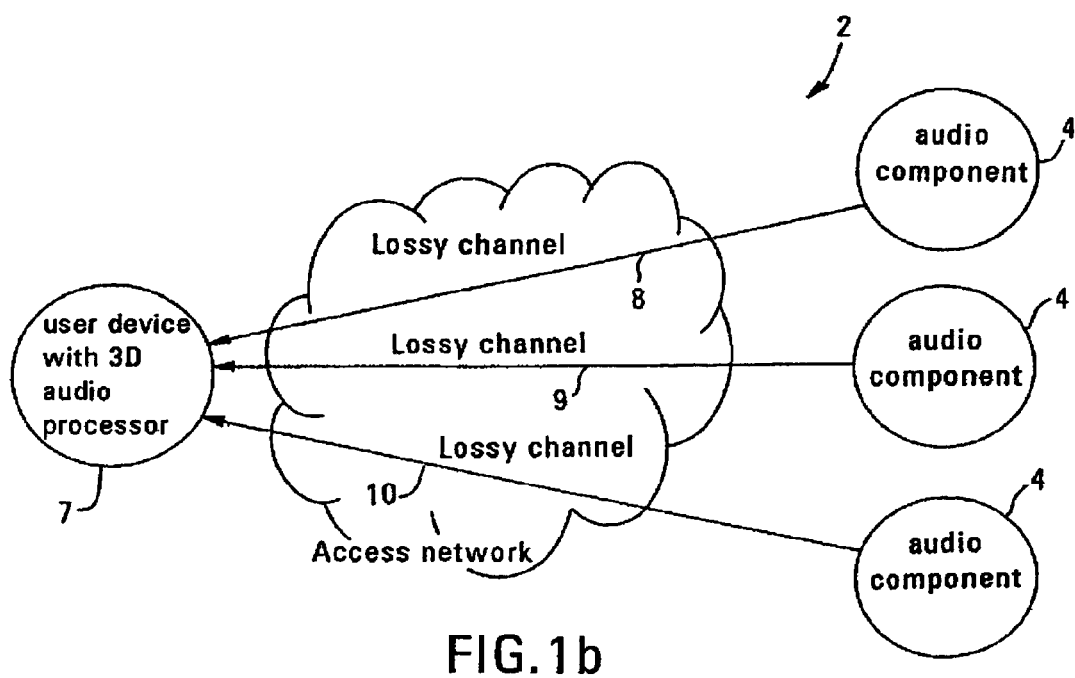

The degradation of the three-dimensional spatialisation effect can be reduced using the system shown in FIG. 1b. Here, the user device 7 is provided with an audio processor. In this case, each audio component is transmitted separately to the user device 7 (or rather the audio processor of the user device) by means of separate channels 8, 9, and 10 over the access network 6. In this way, the spatialisation processing is performed after the link and so there will be no degradation of the spatialisation effect. However, there is the disadvantage that the link requires a greater total bandwidth to carry all three channels. In many network applications, particularly mobile network applications, the bandwidth of the access network is a limited and expensive commodity.

Figure 1C:
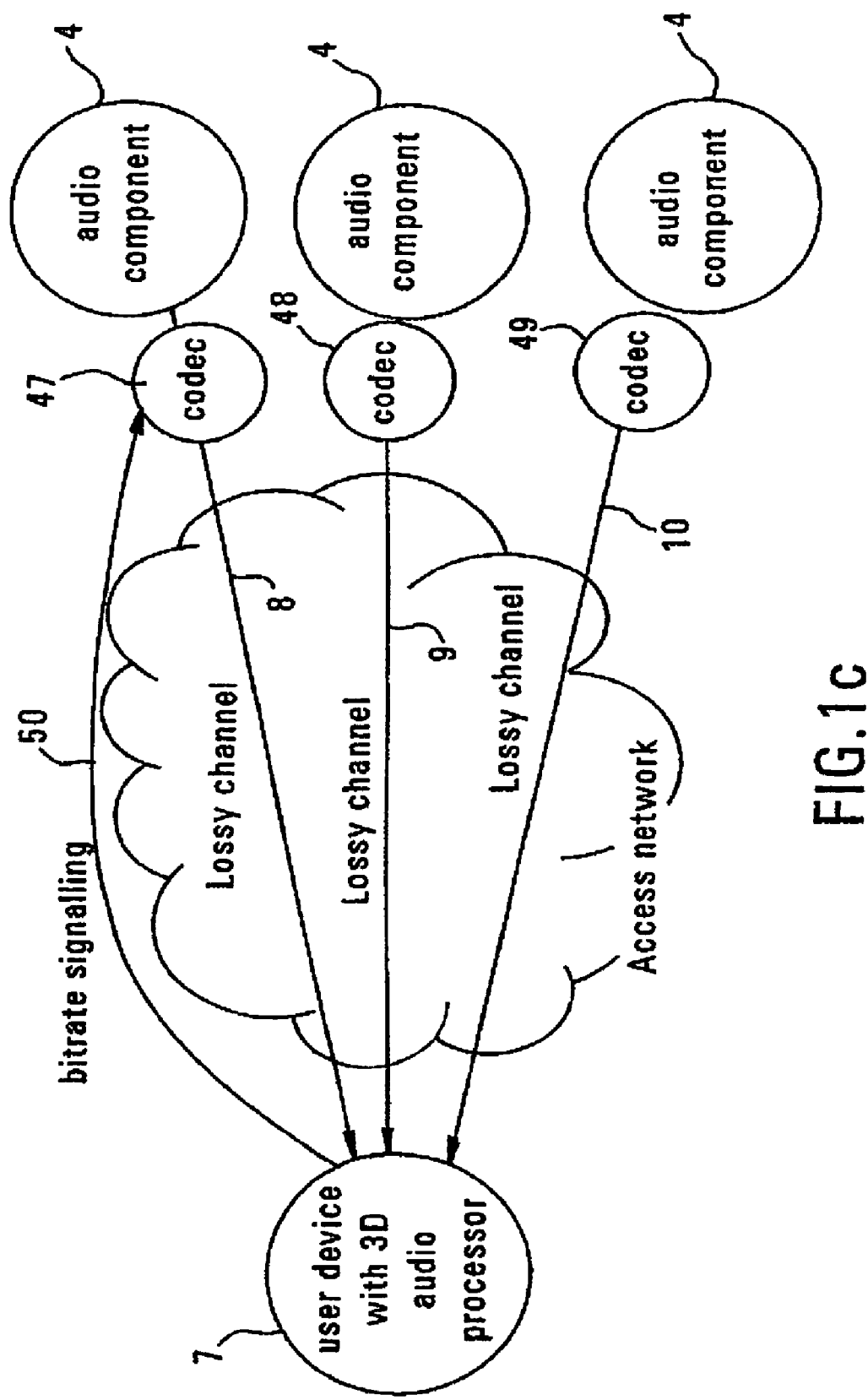

FIG. 1c shows a modified version of FIG. 1b. Briefly put, each audio component 4 is transmitted using a respective codec 47, 48, 49, the transmission bit-rates of which are controlled by a signal (represented in FIG. 1c by numeral 50) sent back from the user device 7.

Figure 2:
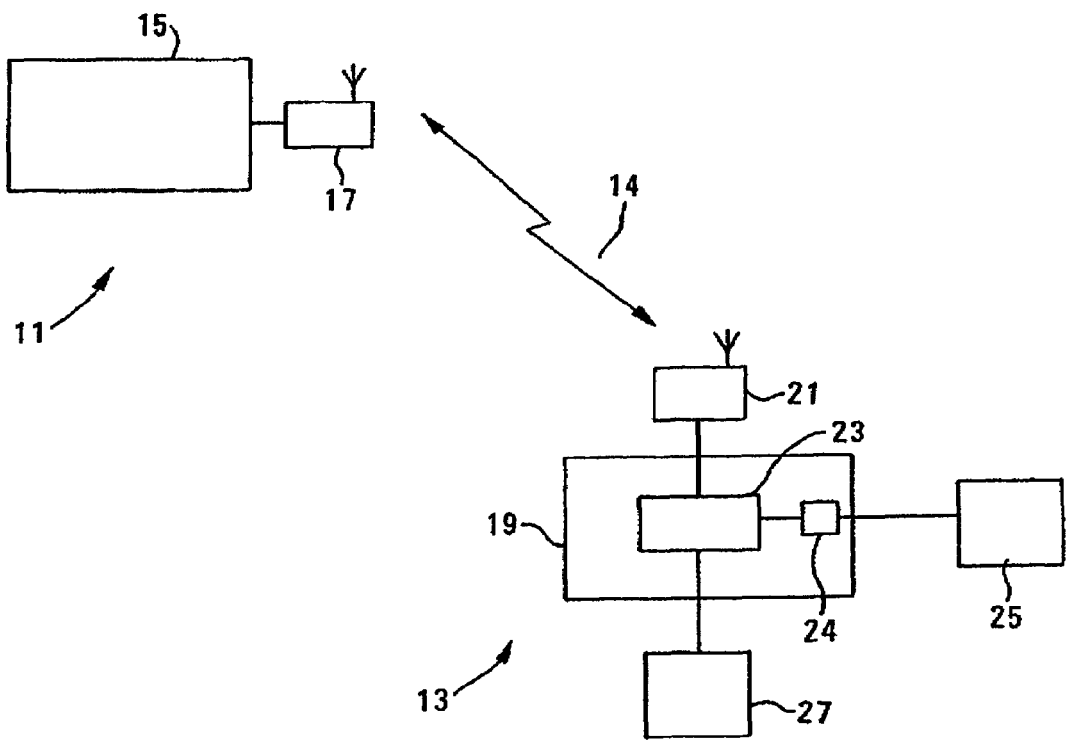
FIG. 2 is a block diagram showing the hardware components in an audio system according to an embodiment of the invention.

Referring now to FIG. 2, an audio system according to an embodiment of the invention, comprises an audio source terminal 11 and a audio playback terminal 13, connected to each another by a wireless data link 14. The source terminal 11 comprises a source computer 15, and a cellular modem 17. The playback terminal 13 comprises a playback computer 19 having an internal processor 23 and an audio processor 24. Instead of being in the form of a computer, the playback terminal 13 could be provided as a mobile device, such as a mobile telephone or personal digital assistant (PDA). Connected to the processor 23 is a cellular modem 21, an audio transducer 25, and a user control 27. If the playback terminal was in the form of a mobile device such as a mobile telephone or PDA, the audio transducer and user control may well be integral with the mobile device. The wireless data link 14 is established using respective cellular modems 17, 21 which enable a network connection to be set-up using existing cellular telecommunications networks (as are used in mobile telephony systems). The source computer 15 and the playback computer 19 can be conventional personal computer (PC) devices.

In use, the source terminal 11 acts as a server device by which remotely located computers (such as playback terminal 13) can access particular services. These services can include, for example, E-mail access, the provision of information, on-line retail services, and so on. The audio source terminal 11 essentially provides the same utility as a conventional Internet-style server. However, in this case, the presentation of available services is not performed using visual data displayed at the remote terminal, but instead, audible sound is used to present services.

Source computer 15 includes an audio processor and a memory (neither being shown in FIG. 2), which stores data relating to a number of audio components. In this case, data relating to first, second and third audio components is stored (however a fewer or a greater number of services may be provided). Storage of the audio components is not essential, it being possible for the components to be sent as live feeds from a remote device. Each audio component corresponds to a particular service which can be accessed either directly from the audio source terminal (i.e. from its internal memory), or by indirect means (i.e. by a further network connection to a remote device storing the information).

Each audio component comprises two types of data, namely (a) audio data relating to an audible sound or track which, when played, represents the service which is accessible from the source terminal 11, and (b) positional data. The positional data defines the position in space, relative to a sound output device (in this case the audio transducer 25 of the playback terminal 13), at which the audio data is to be perceived by a user. Specifically, the positional data defines the three-dimensional position in space at which the audio data is to be perceived by a user. In this respect, it will be appreciated that three-dimensional processing and presentation of sound is commonly used in many entertainment-based devices, such as in surround-sound television and cinema systems. Indeed, such three-dimensional audio processing is now commonplace in computer games, whereby the so-called Head Related Transfer Function (HRTF) is used. This transfer function has evolved to enable a sound source to be variably positioned in the three-dimensional audio field and relates source sound pressured to ear drum sound pressures. The operation by which the services, represented by the three components stored at the audio source terminal 11, are accessed by the audio playback terminal 13, will now be described with reference to FIG. 3. Since the operation of the cellular modems 7, 11 is conventional, these modules are not shown in FIG. 2.

Initially, the wireless data link 14 is established between the source terminal 11 and the playback terminal 13. This data link 14 is established over a suitable access network, represented in FIG. 3 by the numeral 35. As will be appreciated by those skilled in the art, the data link 14 will have restricted bandwidth, and be prone to interference and noise. Although the data link 14 described is in the form of a cellular communications network, other wireless data links could be used, e.g. IEEE 802.11, wireless LAN or even Bluetooth. At the source terminal 15, audio data relating to the first, second, and third audio components are input to an audio processor 34 whereby a set of spatially processed data, representing the audio field to be presented at the playback terminal, is generated. This spatially processed data comprises the audio data for each component suitably combined with its associated positional data. Also, the first, second and third audio components are separately input to first, second, and third codecs 29, 31, and 33, respectively.

The codecs 29, 31, and 33 are, in this case, variable bit-rate speech codecs. Such codecs are able to encode data at a number of bit-rates and can dynamically and rapidly switch between these different bit-rates when encoding a signal. This allows the encoded bit-rate to be varied during the course of transmission. This can be useful when it becomes necessary to accommodate changes in access network bandwidth availability due to congestion or signal quality. An example variable bit-rate codec is the GSM Adaptive Multi Rate (AMR) codec. The AMR codec provides eight coding modes providing a range of bit-rates for encoding speech: 4.75 kbit/s, 5.15 kbit/s, 5.9 kbit/s, 6.7 kbit/s, 7.4 kbit/s, 7.95 kbit/s, 10.2 kbit/s, and 12.2 kbit/s. When operating in a coding mode, the input signal to such a codec is sampled at a rate of 8 kHz, and 20 ms frames of input samples are encoded into variable length frames according to the coding mode. In a decoding mode, the frames of coded samples are decoded into 20 ms frames of samples. The degradation in quality in the output relative to the input is more severe for the lower bit-rates than for the higher bit-rates.

In the next stage, the spatially processed data (generated in the audio processor 34) is transmitted over the data link 14 to the processor 23 of the playback computer 19. This transmission is represented by channel 42. The spatially processed data is transmitted using the channel 42 at a first bit-rate $b_1$. At the same time, each of the individual audio components are also transmitted to the processor 23 by means of their respective codecs 29, 31, and 33. Specifically, the first, second and third codecs 29, 31, and 33 receive, respectively, the first, second, and third audio components stored in the source computer 15 and encode the components for transmission over the data link 14. These transmissions are represented by the channels 37, 39 and 41 (which may be referred to as 'tracer channels'). The codecs 29, 31, and 33 are configured to transfer the audio components at a second bit-rate $b_2$ which is less than that of the first bit-rate $b_1$. Since the audio components are transmitted at a lower bit-rate, their audible quality (when played) will be degraded. Bandwidth requirements, however, are reduced. Also, it should be understood that it is not necessary for the individual audio components to be transmitted at the same, lower, bit-rate. For example, each of the three components could be transmitted at a different respective bit-rate. However, these different bit-rates are assumed to be lower than the first bit-rate. The bit-rates used could even be continuously variable. The point is that the overall bandwidth used is controlled at a suitable level whilst maintaining audible quality.

As mentioned previously, due to the nature of the data link 14 using the access network 25, the three-dimensional nature of the audio contained in the spatially processed data will be degraded, possibly masking perception of the intended three-dimensional positioning of sound. As regards the separately transmitted audio components, since these have not been spatially processed, the positional data will not be affected. At the processor 23 of the playback computer 19, the received spatially processed data is played through the audio transducer 25. At the same time, each of the low-bandwidth audio components are input to the audio processor 24 via the processor 23. This further set of spatially processed data is then played through the audio transducer 25. The overall effect of adding the spatially processed data (constructed from the low bit-rate versions of the individual audio components) to the audio field is to allow association, by the human ear, of the degraded spatially processed signal with poor positional accuracy, with the low-bit rate audio components having low quality audio (due to the low bit-rate transmission) but good positional accuracy. The net result will be restoration of human perception of the three-dimensional position information.

In order for the above technique to work, synchronisation of the spatially processed data and the audio components is catered for by the processor 23.

In order to keep the overall bandwidth of the data link 14 to a low level, the bit-rate $b_2$ at which each audio component is sent from each codec 29, 31, and 33, to the playback computer 19, can be set significantly lower than the bit-rate, $b_1$, at which the spatially transmitted data is sent. As mentioned previously, the lower bit rate $b_2$ does not necessarily have to be the same for each component.

Figure 3:
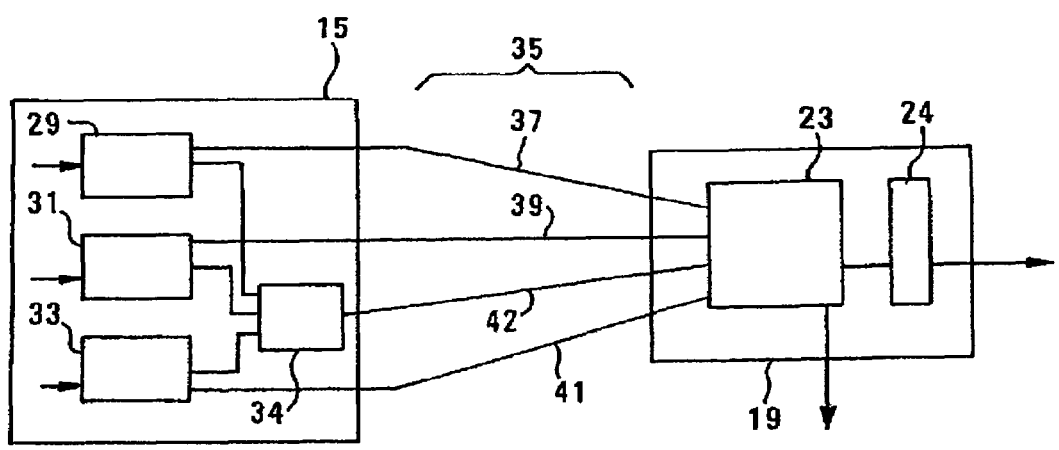
FIG. 3 is a block diagram showing the data channels between two of the hardware components shown in FIG. 2.

Referring now to FIG. 4, a practical embodiment of the playback part of the audio system of FIGS. 2 and 3 is shown. The playback computer 19 is connected, by a cable 52 to an audio transducer, in this case a set of speakers 45. Also, the playback computer 19 is connected to a user-control device, in this case a head-mountable position sensor 49. This connection is made by means of a cable 51. The use of the cables 52 and 51 is not essential, and the wireless data link methods mentioned above could be used (e.g. Bluetooth).

In use, a user is positioned in front of the speakers 45 and wears the head-mountable position sensor 50. The position sensor 50 is arranged to generate direction data which is representative of the direction in which the user is facing (alternatively, it may be chosen to be representative of the gaze direction of the user, i.e. where the user's general direction of sight is directed, though this requires a more sophisticated sensor). Next, the user listens to the sounds being emitted from the speakers 45. The spatially processed data and the first, second, and third audio components are received from the source computer 5 and so first, second and third sounds are heard at three different positions in the three-dimensional audio field. The first, second, and third sounds are represented by the symbols 53*a*, 53*b*, and 53*c*. The first sound 53*a* is heard to the left of the user's head, the second sound 53*b* in front of the user's head, and the third sound 53*c* to the right of the user's head. The first, second, and third sounds 53*a*, 53*b*, and 53*c* represent different services which may be accessed from the source computer 15 by means of the data link 14. The sounds are preferably indicative of the actual service they represent. Thus, the first sound 53*a* may be "E-mail" if it represents an E-mail service, the second sound 53*b* "restaurant" if it represents a restaurant information service, and the third sound 53*c* "banking" if it represents an on-line banking service. In use, the user will choose one of the sounds, in three-dimensional space, as a 'focus' sound, by means of looking in the general direction of the sound. This focus sound is chosen on the basis that the user will have an interest in this particular sound. The determination as to which sound is the focus sound may be used to output that sound at a higher volume, for example.

Figure 4A:
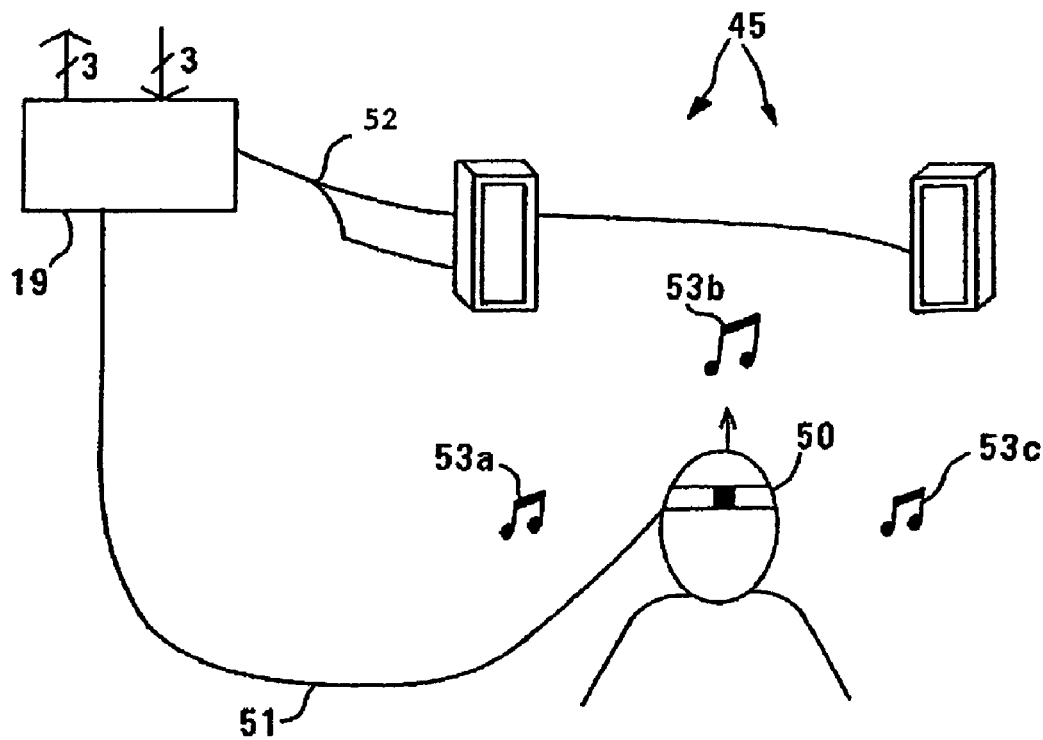
FIGS. 4a and 4b are perspective views of a practical embodiment of the interactive audio system shown in FIG. 2.
Figure 4B:
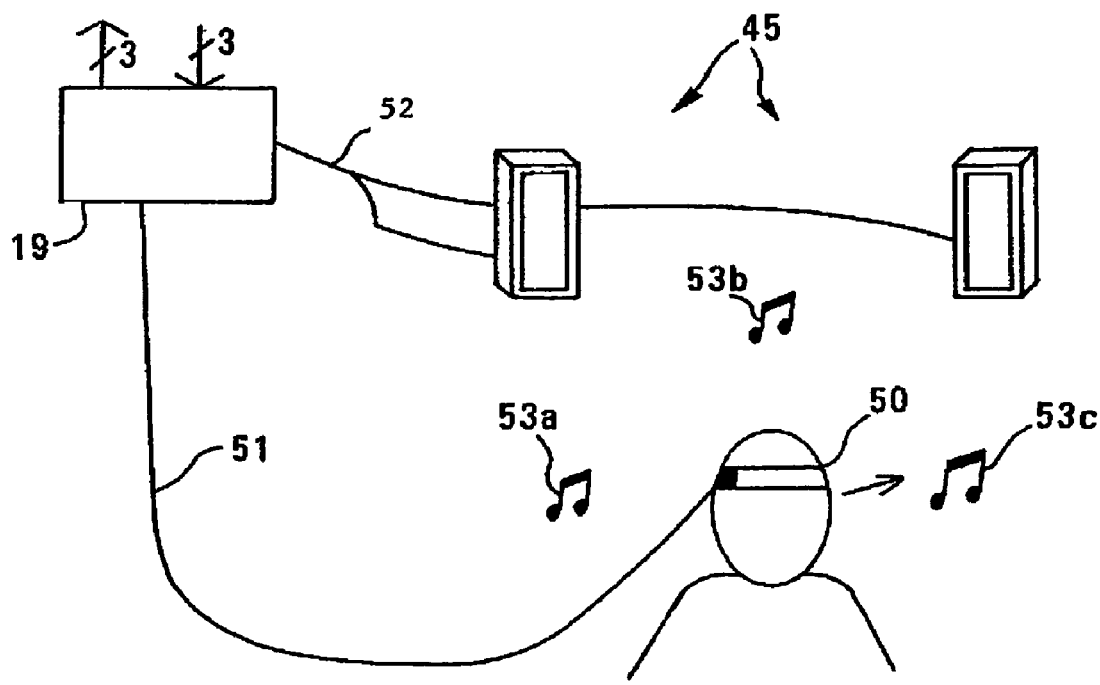

Referring to the specific case shown in FIG. 4a, it will be seen that the user's gaze direction is generally in the forwards direction, i.e. towards the second sound 53b. This is the focus sound. In FIG. 4b, the user has chosen the third sound 53c as the focus sound.

The above-described method, whereby a set of spatially processed data, and separate audio components are received and output to a transducer means (e.g. a set of speakers) is controlled by software provided on the processor 23.

Whilst the above-described embodiment utilises a head-mountable position sensor 39, many different user-control devices 15 can be used. For example, the user might indicate the focus component by means of a control switch or button on a keyboard. Alternatively, a voice recognition facility may be provided, whereby the user states directional commands such as "left", "right", "up" or "down" in order to rotate the audio field and so bring the desired sound to a focus position. The command may even comprise the sound or jingle itself.

Once the user has decided that a particular sound should be operated (bearing in mind that each sound in the audio field represents a service which can be accessed from the source computer 9) then, in a further stage, the user operates the service. This can be performed by the user pressing a particular button on a keyboard, or by saying a keyword, if a voice recognition facility is provided, when the desired service is selected as the focus sound. The effect of operating the service is analogous to a user clicking on an Internet-style hyperlink. By operating the service represented by sound, a further set of sound-based services can be presented as sub-links within the original sound based service. Thus, if the user operates the "E-mail" sound based service, then a further set of sounds may be presented, e.g. "inbox", "outbox", "sent E-mails" and so on.

In the above embodiments, although the interactive audio system has been described with one audio source, it will be appreciated that the individual audio components might originate from a number of different audio sources. For some applications, the positional data for the audio components may, at least partly, be determined at the playback terminal, and transmitted to the audio source. An example of how this would be useful is where the exact position and relative orientation of the user within a locally defined co-ordinate system is known only by the playback terminal (e.g. from magnetic sensors and location sensors), the information from the sensors being sent back to the audio source so as to determine where each sound is to be located.

Whilst the concept of a 'focus' sound or track has been described above in relation to a single sound, it is possible for more than one sound or track to be a focus at a particular point in time.

As has been described above, a technique is provided in order to minimise, or at least reduce, the bandwidth required to transmit the audio components to the user device (i.e. the playback computer 9), whilst preserving a high quality three-dimensional audio interface. In this technique, the three-dimensional audio processing is performed at the source of the audio components. This can be some network node that aggregates audio components. As discussed above, subsequent transmission across a lossy channel will result in a degradation of the three-dimensional spatialisation of the audio interface.

To combat this degradation, a low bandwidth 'tracer' for each audio component is transmitted to the user device in addition to the three-dimensional spatialised audio signal. The tracer may comprise a description of the component's intended position in the three-dimensional audio field and a low-bitrate version of the audio data. The low bit-rate audio data in the tracer is of much lower quality than the main three-dimensional audio signal and its components. However, due to its correlation with the original audio component, it is sufficient to allow association by the human ear with the corresponding component in the main three-dimensional signal.

At the user device, the tracers are used to add the low-bitrate (low quality) versions of each component to the three-dimensional audio field with high positional accuracy (noting that even poor quality audio signals may be positioned with high accuracy in a three-dimensional audio field). The combination of a high quality signal with low three-dimensional audio positional accuracy, and a set of low quality signals with high three-dimensional audio positional accuracy results in the restoration of the human perception of three-dimensional position to the degraded three-dimensional audio signal.

An advantage of this technique is that the three-dimensional audio channel may be generated in a network-based device, thereby reducing the bandwidth required in the access network to that of a stereo channel. Those devices capable of rendering three-dimensional audio may request the additional tracers whilst other devices may simply render the main stereo channel. The bandwidth required to transmit the tracers is small compared to that required to transmit all component signals.

The invention claimed is:

1. An audio system comprising:
   an audio source;
   a playing terminal adapted to be coupled to the audio source by a data link; and
   an audio transducer arrangement adapted to be coupled to the playing terminal,
   the audio source being arranged to derive an audio component comprising (a) audio data corresponding to aural content of an audible sound or track, and (b) positional data corresponding to the position in space relative to transducers of the audio transducer arrangement, at which the audible sound or track is to be perceived by a user, the audio source being arranged to be coupled with the playing terminal so the positional data (b) and the audio data (a) are coupled from the audio source to the playing terminal at first and second bit rates, respectively, where the second bit rate is lower than that of the first bit rate, the playing terminal being arranged to cause the transducers of the audio transducer arrangement to derive aural outputs in accordance with the audio data (a) and the positional data (b).

2. An audio system according to claim 1, further comprising a user control device coupled to the playing terminal and arranged to enable user-selection of one of the audible sounds or tracks, corresponding to one of the audio components outputted from the audio transducer arrangement, as a focus sound or track.

3. An audio system according to claim 2, wherein the user control device comprises a position sensor for being mounted on a body part of a user, the position sensor being arranged to cause selection of an audible sound or track as the focus sound or track by generating position data indicating the relative position of the user's body part, the playing device thereafter being arranged for comparing the position data with the positional data for each of the audio components for determining the audible sound or track to which the user's body part is directed.

4. An audio system according to claim 3, wherein the position sensor is a head-mountable sensor, the playing device being arranged to determine the audible sound or track to which a part of the user's head is directed.

5. An audio system according to claim 2, wherein the user control device comprises a selection switch or button.

6. An audio system according to claim 2, wherein the user control device comprises a voice recognition facility arranged to receive audible commands from a user and to interpret the received commands for determining which audible sound or track is selected as the focus sound or track.

7. An audio system according to claim 1, wherein coupling between the audio source and the playing terminal includes a wireless data link.

8. An audio system according to claim 7, wherein the wireless data link includes a mobile telephone connection.

9. An audio system according to claim 1, wherein the audio source includes a network-based device.

10. The audio system of claim 1 in combination with a source computer arrangement, the source computer arrangement including plural different computer-based services, the different transducers being located at different positions relative to a user of the terminal so the sounds originating at the different transducers are adapted to be perceived by the user as originating from different directions and the sound originating from each direction is associated by the user with a different one of the computer-based services, the high bit rate data being adapted to control from which direction is derived the audio data associated with a particular computer-based service.

11. An audio system comprising: an audio source arrangement;
    an audio playing arrangement adapted to be coupled to the audio source arrangement by a data link; and
    an audio production arrangement coupled to the playing terminal,
    wherein the audio source arrangement is arranged to derive a plurality of audio components, each derived audio component comprising (a) audio data indicative of aural content of an audible sound or track, and (b) positional data indicative of the position in space at which the aural content of each aural sound or track is perceived to be by a user relative to transducers adapted to be driven by the audio production arrangement, the audio source arrangement being arranged to (i) generate, from the plurality of audio components, a first set of spatially processed data for transmission over the data link at a first bit rate, and (ii) individually transmit each of the audio components over the data link at a bit-rate which is lower than that of the first bit rate, the audio playing arrangement being arranged to receive the first set of spatially processed data and each individual audio component, at their respective bit-rates, to generate a second set of spatially processed data using the individual audio components, and to output the first and second sets of spatially processed data to the audio production arrangement.

12. A playing terminal for use in an audio system, the playing terminal comprising:
    a first port for receiving data from an audio source via a data link; and
    a second port for outputting data, from the playing terminal, to transducers of an audio transducer arrangement,
    wherein the playing terminal is arranged to receive, via the first port, a plurality of audio components, each audio component comprising (a) audio data corresponding to aural content of an audible sound or track, and (b) positional data corresponding to a position in three-dimensional space, relative to transducers of the audio transducer arrangement, at which each audible sound or track is to be perceived by a user, the positional data (b) being adapted to be received at a bit-rate which is greater than that at which the audio data is received, the playing terminal being arranged to respond to the received audio data (a) and the received positional data (b) by deriving signals for driving the transducers so that the transducers can derive plural aural outputs that the user can perceive the aural content as coming from different positions in space and to selectively apply, at different times, by way of the second port different ones of the audio data (a) to the transcuers so that at the different times different ones of the aural content (a) are perceived by the user to come from different locations determined by positional data (b) and by selection by the user.

13. A method of operating a playing terminal for use in an audio system, the method comprising:
    receiving, at the playing terminal, a plurality of audio components transmitted over a data link from a remote audio source, each component comprising (a) audio data corresponding to aural content of an audible sound or track, and (b) positional data corresponding to a position in three-dimensional space relative to transducers of an audio transducer arrangement, at which each audible sound or track is to be perceived by a user;
    receiving, at the playing terminal, first and second sets of audio data (a) and positional data (b), the positional data (b) being received at a bit-rate which is greater than the bit-rate at which the audio data (a) is received, the first set being associated with a first aural content at a first of the positions, the second set being associated with a second aural content at a second of the positions; and
    selectively causing the first and second aural contents to be applied to the transducers so that during a first interval the user perceives the first aural content as coming from the first position and during a second interval the user perceives the second aural content as coming from the second position.

14. A method according to claim 13, wherein a user control device is coupled to the playing terminal, the method further comprising operating the user control device so as to select an audible sound or track corresponding to one of the audio components outputted from the audio transducer arrangement, as a focus sound or track.

15. A method according to claim 14, wherein the step of operating the user control device comprises operating a position sensor mounted on a body part of a user, the position sensor causing selection of an audible sound or track as the focus sound or track by generating position data indicating the relative position of the user's body part, the playing device thereafter comparing the position data with the positional data for each of the audio components so as to determine the audible sound or track to which the user's body part is directed.

16. A method according to claim 15, wherein the position sensor is a head-mountable sensor, the playing device determining the audible sound or track to which a part of the user's head is directed.

17. A method according to claim 14, wherein the step of operating the user control device comprises operating a selection switch or button.

18. A method according to claim 14, wherein the step of operating the user control device comprises operating a voice recognition facility so the facility receives audible commands from a user and interprets the received commands determines which audible sound or track is selected as the focus sound or track.

19. A method according to claim 13, wherein the data link includes a wireless data link.

20. A method according to claim 19, wherein the wireless data link includes a mobile telephone connection.

21. The method of claim 13, wherein the method is performed as a way of presenting different computer-based services, the different transducers being located at different positions relative to a user of the terminal so the sounds originating at the different transducers are perceived by the user as originating from different directions and the sound originating at each direction is associated by the user with a different one of the computer-based services, the high bit rate data controlling the directions from which the audio data associated with a particular computer-based service is perceived by the user to be derived.

22. A computer program stored on a computer-usable medium, the computer program comprising computer-readable instructions for causing a processing device to perform the steps of:
   receiving, at the processing device, a plurality of audio components transmitted over a data link from a remote audio source, each component comprising (a) audio data corresponding to an audible sound or track, and (b) positional data corresponding to the position in three-dimensional space, relative to transducers of an audio transducer arrangement, at which each audible sound or track is to be perceived by a user, the audio data (a) and positional data (b) being transmitted over the data link received at the processing device, under control of the program, at first and second bit rates, respectively;
   the second bit-rate being greater than the first bit-rate; and
   generating, in response to the received plurality of audio components, first and second sets of spatially processed data indicative of aural content indicated by the first and second sets of the audio data (a) at first and second locations indicated by the positional data (b), and simultaneously applying the first and second sets of spatially processed data to the transducer arrangement coupled to the playing terminal.

23. A source computer arrangement for controlling an output arrangement of a playing terminal including plural different audio output transducers, the different transducers being located at different positions, the terminal being arranged to be connected to the transducers so sounds originating at the different transducers are adapted to be perceived by a user of the terminal as originating from different directions, the source computer arrangement including:
   plural audio sources adapted to be coupled to the terminal via a data link, each of the audio sources being associated with sounds perceived by the user as originating from the different directions, each of the audio sources including (a) audio data relating to aural content of an audible sound or track perceived by the user as originating from one of the directions and (b) positional data indicative of the direction from which the user perceives the aural content as originating, the audio sources being arranged to transmit to the terminal via the link (i) the audio data at a first bit rate, and (ii) the positional data at a second bit rate that exceeds the first bit rate.

* * * * *